(12) United States Patent
Johnson et al.

(10) Patent No.: US 7,162,413 B1
(45) Date of Patent: Jan. 9, 2007

(54) RULE INDUCTION FOR SUMMARIZING DOCUMENTS IN A CLASSIFIED DOCUMENT COLLECTION

(75) Inventors: David E. Johnson, Cortlandt Manor, NY (US); Frederick J. Damerau, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/349,494

(22) Filed: Jul. 9, 1999

(51) Int. Cl.
 G06F 17/27 (2006.01)
 G06F 12/21 (2006.01)

(52) U.S. Cl. .............................. 704/9; 715/531; 706/45
(58) Field of Classification Search ..................... 704/1, 704/9, 10; 707/530, 531, 532; 706/45–47
 See application file for complete search history.

(56) References Cited

U.S. PATENT DOCUMENTS

| | | | | |
|---|---|---|---|---|
| 5,077,668 A | * | 12/1991 | Doi | 715/531 |
| 5,297,027 A | * | 3/1994 | Morimoto et al. | 715/501.1 |
| 5,384,703 A | | 1/1995 | Withgott et al. | |
| 5,689,716 A | * | 11/1997 | Chen | 715/500 |
| 5,745,602 A | * | 4/1998 | Chen et al. | 382/229 |
| 5,778,397 A | * | 7/1998 | Kupiec et al. | 715/500 |
| 5,848,191 A | * | 12/1998 | Chen et al. | 382/229 |
| 5,918,240 A | * | 6/1999 | Kupiec et al. | 715/531 |
| 5,924,108 A | * | 7/1999 | Fein et al. | 715/531 |

OTHER PUBLICATIONS

Chidanand Apte, Automated Learning Of Decision Rules for Rext Categorization, Jul. 1994, pp. 233–251.*
Barzilay et al. "information fusion in the context of multi-document" Jan. 1999.*
Goldstein "Automatic Text Summarization of Multiple Documents", Jun. 1999.*
"Towards Multidocument Summarization by Reformulation: Progress and Prospects" 1–8.*
Cohen "Fast Effective Rule Induction" 1995.*
D. Radev et al; Generating Natural Language Summaries from Multiple On–Line Sources; 1998 Assoc. for Computational Linguistics; vol. 99, No. 9 pp1–54.

* cited by examiner

Primary Examiner—Patrick N. Edouard
(74) Attorney, Agent, or Firm—McGuire Woods LLP; Stephen C. Kaufman

(57) ABSTRACT

A method and apparatus for providing summaries of documents belonging to a class of documents in a classified document collection. A sample set of documents belonging to one or more classes is processed via a machine learning system in order to induce a set of rules associated with the sample set of documents. The vocabulary in the rules are extracted and compared to words, terms or phrases of an incoming document. Any matches between the extracted rules and the words, terms or phrases of the incoming document are used as a summary for the incoming document. By using the method and apparatus, each document does not have to be processed to find most important words and the like in order to provide a summary for that document and then repeating the same process for additional documents.

19 Claims, 3 Drawing Sheets

RULE INDUCTION FOR SUMMARIZING DOCUMENTS IN A CLASSIFIED DOCUMENT COLLECTION

BACKGROUND OF THE INVENTION

1. Field of the Invention

The present invention generally relates to a method and apparatus for providing document summaries and, more particularly, to a method and apparatus for providing summaries of documents belonging to a class in a classified document collection.

2. Background Description

Businesses and institutions generate countless amounts of documents in the course of their commerce and activities. These documents range from business proposals and plans to intra-office correspondences between employees and the like.

The documents of a business or institution represent a substantial resource for that business or institution. Thus, in order to more effectively store these documents it is not uncommon for the business or institution to digitally store these documents on a magnetic disc or other appropriate media.

One known method for electronically storing the documents is to first scan the documents, and then process the scanned images by optical character recognition software to generate machine language files. The generated machine language files are then compactly stored on magnetic or optical media. Documents originally generated by a computer, such as with word processor, spread sheet or database software, can of course be stored directly to magnetic or optical media.

There is a significant advantage from a storage and archival stand point to storing documents, but there remains a problem of retrieving information from the stored documents. In the past, retrieval of the documents has been accomplished by separately preparing an index to access the documents. To this end, a number of full text search software products have been developed which respond to structured queries to search a document database.

In order to further search documents, it is not uncommon for retrieval systems to prepare summaries of stored documents so that a user only has to read through the document summaries in order to find relevant documents. The use of such summary retrieval systems thus greatly reduces the time required to review the stored documents and thus provides reduced costs associated with the search and review of the stored documents.

Document summaries can be generated after document creation either manually or automatically. Of course, manually creating summaries provides high quality, but is cost prohibitive due to the labor intensive tasks of manually reading and summarizing the documents. On the other hand, automatic summaries are less expensive, but current systems do not obtain consistently high quality document summaries.

A common approach for automatically generating document summaries of individual documents relies upon either natural language processing or quantitative content analysis. Natural language processing is computationally intensive, while quantitative content analysis relies upon statistical properties of text to produce summaries. In both cases (e.g., natural language processing or quantitative content analysis), a document is typically processed in isolation to determine important words or phrases or terms, and then those words or phrases or terms are used to provide a summary of that particular processed document. Thus, in order to provide summaries for individual documents, each document is first separately processed to determine the important words or phrases or terms therein, and thereafter further processed to match those important words to provide a summary thereof. As is well understood by one of ordinary skill in the art, this type of approach is resource inefficient and time consuming.

By way of example, U.S. Pat. No. 5,689,716 to Chen discloses an automatic method of generating thematic summaries of a single document. The Chen technique begins with determining the number of thematic terms to be used based upon the number of thematic sentences to be extracted in the document. The Chen method then identifies the thematic terms within the document, and afterward, each sentence of the document is scored based upon the number of thematic terms contained within the sentence. The desired number of highest scoring sentences are then selected as thematic sentences. This same process must be used for any additional documents.

A variant of the Chen method is disclosed in U.S. Pat. No. 5,384,703 to Withgott, et al. Withgott uses regions instead of sentences, and more specifically, discloses a method and apparatus for summarizing documents according to theme. By using the method and apparatus of Withgott a summary of a document is formed by selecting regions of a document, where each selected region includes at least two members of a seed list. The seed list is formed from a predetermined number of the most frequently occurring complex expressions in the document that are not on a stop list. If the summary is too long, the region-selection process is performed on the summary to produce a shorter summary. This region-selection process is repeated until a summary of that particular document is produced having a desired length. Each time the region selection process is repeated, the seed list members are added to the stop list and the complexity level used to identify frequently occurring expressions is reduced. Similar to Chen, this same process must be used for any additional documents.

An approach used for providing a single summary for an entire collection of documents is disclosed in "Generating Natural Language Summaries from Multiple On-Line Sources" Dragomir Radev et al, Computational Linguistics, vol. 99, Nov. 9, 1998. In the Radev approach, linguistic analysis of a document collection includes filling predefined templates or information structures, and then using natural language generation techniques to provide a readable version of the formatted template.

Accordingly, what is needed is a method and system which is capable of providing a summary of individual documents without having to perform a resource intensive process on each individual document. What is further needed is a method and system which is capable of providing a summary of more than one document belonging to a class in a classified document collection.

SUMMARY OF THE INVENTION

The present invention is directed to a method and apparatus for providing summaries of documents belonging to a class of documents in a classified document collection. In embodiments of the present invention, a sample set of documents belonging to one or more classes is processed via a machine learning system in order to induce a set of rules associated with the sample set of documents.

In order to induce the rules associated with the sample set of documents one of any known machine learning system may be implemented by the apparatus of the present invention, such as, for example, (i) a rule based engine, (ii) decision tree system (iii) a multiplicative update based algorithm engine or (iv) any other well known machine learning system from which rules can be derived. By way of one example, the machine learning system trains on the set of sample pre-classified documents by (i) preparing the sample set of documents, (ii) training on the sample set of documents and (iii) testing a set of the preclassified documents.

Once the rules or set of rules are induced, the set of rules may then be extracted (e.g., decomposed to provide a concise description of the class) and used to provide summaries for individual documents belonging to the same class of documents as the sample documents. More specifically, the words or phrases or terms of each incoming document may be matched to the extracted rules or set of rules associated with the sample documents in order to provide a summary of each of the incoming documents.

It is contemplated that in addition to providing summaries for each of the incoming documents, a header or other identifying feature of the incoming document may be provided with the summary of the incoming document. This allows the user to easily determine which summary belongs to which summarized document. In further embodiments, the summary of each document may be provided with an "address", or may equally be provided with a hyperlink to the incoming document.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
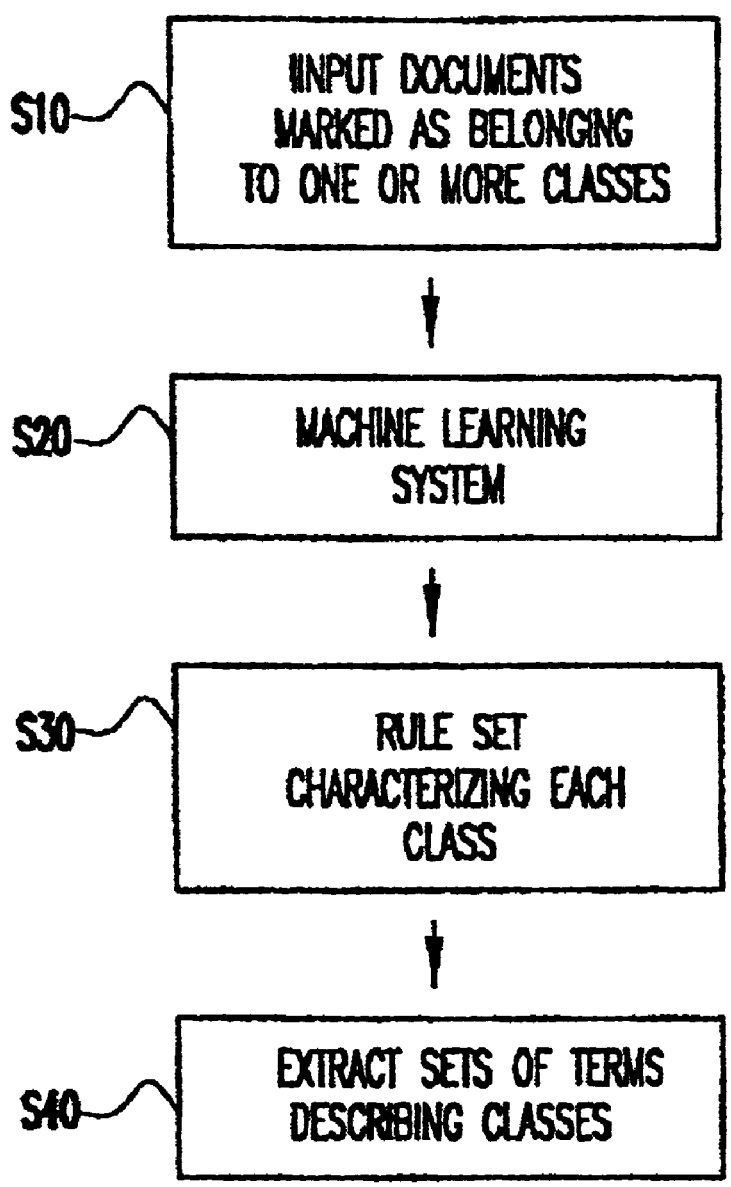
FIG. 1 is a general layout of a flow diagram for processing of sample data marked as belonging to one or more classes.

The present invention is directed to a method and apparatus for providing document summaries. More specifically, the present invention is directed to a method and apparatus for providing summaries of incoming documents belonging to a class of documents in a classified document collection by, in embodiments, (i) processing a sample set of documents in order to induce a set of rules (e.g., vocabulary of words or attributes of the sample document) which provide a characterization of each class in the collection (ii) comparing extracted words, phrases, terms and the like from the set of induced rules to each individual incoming document and (iii) providing a summary of the incoming document based on any matches between the extracted rules induced from the sample set of documents and words, terms or phrases of the incoming document.

Being even more specific and in order to accomplish the objectives of the present invention, a sample set of documents (e.g., data) is provided to a machine learning system in order to induce a vocabulary of rules or set of rules (e.g., attributes of the sample document) associated with the sample set of documents. Typically, the sample set of documents belongs to one or more classes. The rules or set of rules associated with the sample set of documents may then be extracted, and the method and apparatus of the present invention compares these extracted rules to an incoming stream of documents in order to provide a summary for each of these incoming documents. It is well understood by one of ordinary skill in the art of rule based learning systems that "extracted" refers to the decomposition of a rule to provide a concise description of the class of sample set of documents such as, for example, words, phrases, terms and the like.

In embodiments, prior to comparing the rules with the incoming documents, the incoming documents may be refined by, for example, (i) eliminating or combining similarly defined words (e.g., synonyms) within the document, (ii) eliminating stems of words (e.g., "ing", "s", "ed", etc.) or (iii) countless other modification of the incoming document. This provides a more concise description of the incoming documents thereby increasing the efficiency of the method and apparatus of the present invention.

Thus, the approach of the present invention solves the problem of (i) first individually processing a single document in order to find important words, phrases, etc., (ii) processing the document a second time in order to match the important words, phrases, etc. within the document, (iii) providing a summary for that individual document based on the matched words, phrases, etc., and (iv) repeating steps (i)–(iii) for each further document. Instead, the present invention is capable of first defining a set of rules based on a sample set of documents, and using the words, phrases, terms and the like extracted from the rules to provide summaries for a stream of incoming documents. Thus, the apparatus and method of the present invention provides an efficient and cost effective means for providing summaries of documents.

It is well understood that the apparatus and method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Processing a Sample Set of Data

Referring now to the drawings, and more particularly to FIG. 1, there is shown a general layout of a flow diagram for processing sample documents marked as belonging to one or more classes. It should be understood that FIG. 1 may equally represent a high level block diagram showing an apparatus for processing a set of sample documents. It is further well understood that the specific processing of sample documents of FIG. 1 is but one example of processing sample documents, and that any well known method of processing sample documents in accordance with the present invention is contemplated for use herein. Thus, the specific example of FIG. 1 is not critical to the understanding of the present invention and is used merely as one illustration of processing sample documents in order to provide rules therein.

Still referring to FIG. 1, in step S10, sample input documents are marked as belonging to one or more classes (e.g., pre-classified sample input documents). In step S20, the sample input documents are provided to a machine learning system which trains on the sample input documents in order to induce a set of rules associated with the one or more classes, as discussed in more detail below.

In step S30, the rules for characterizing each class is provided. These rules may be, for example, a vocabulary of words that are characteristic of the sample input documents in the one or more class or other attributes associated with the sample input documents. In embodiments, the rules may be further refined by any number of processes, such as, for example, morphological analysis, stemming, tokenization and the like. In step S40, the set of rules are extracted (e.g., decomposed to provide a concise description of the class such as, for example, words, phrases, terms and the like) for use with the method and apparatus of the present invention, as will be described in greater detail with reference to FIGS. 2 and 3.

Machine Learning System

The machine learning system of step S20 may be, for example, (i) a rule based engine, (ii) decision tree system (iii) a multiplicative update based algorithm engine or (iv) any other well known machine learning system from which rules can be derived. The machine learning system is used to provide the rules associated with the sample input documents of one or more class.

By way of one example, the machine learning system, in step S20, trains on the set of sample pre-classified documents by (i) preparing the sample set of documents, (ii) training on the sample set of documents and (iii) testing a subset of the preclassified documents. As discussed in co-pending U.S. patent application No. 09/176,322, incorporated herein by reference in its entirety, data preparation typically involves obtaining a corpus of pre-classified data and training involves training a classifier (e.g., machine learning system) on a corpus of pre-classified documents. Testing includes testing the machine learning system with some subset of the pre-classified documents set aside for this purpose. The process of generating training vectors of the present invention may be divided into three steps, which are strictly illustrative of one example contemplated for use with the present invention. Accordingly, other known processes for generating training vectors can work equally well with the present invention. The following is provided as one example of generating training vectors:

1. Feature definition: Typically this involves breaking the text up into tokens. Tokens can then be reduced to their stems or combined to multi-word terms.

2. Feature count: Typically this involves counting the frequencies of tokens in the input texts. Tokens can be counted by their absolute frequency, and several relative frequencies (relativized to the document length, the most frequent token, square root, etc.).

3. Feature selection: This step includes weighting features (e.g., depending on the part of the input text they occur in: title vs. body), filtering features depending on how distinctive they are for texts of a certain class (filtering can be done by stop word list, based on in-class vs. out-class frequency etc.).

It is well understood that the above method for providing rules is one example contemplated for use with the present invention. Accordingly, other well known methods, including manually inducing rules based on the set of sample input documents, are contemplated for use with the present invention. Thus, the present invention should not be limited in any way to the above illustrated method of obtaining rules for a set of sample documents belonging to one or more classes.

The System of the Present Invention

Once the rules are induced and extracted, words or phrases of each incoming document can then be matched to the extracted rules associated with the sample documents in order to provide a summary of each of the incoming documents. That is, the extracted words, terms or phrases of the rules are matched to the words, terms or phrases of the incoming document in order to provide a summary thereof. Thus, as can clearly be seen, by using the apparatus and method of the present invention, each incoming document does not have to first be processed to find the most important words and the like in order to provide a summary of the incoming document, but may instead be compared to rules of sample documents belonging to the same class as each input document.

Figure 2:
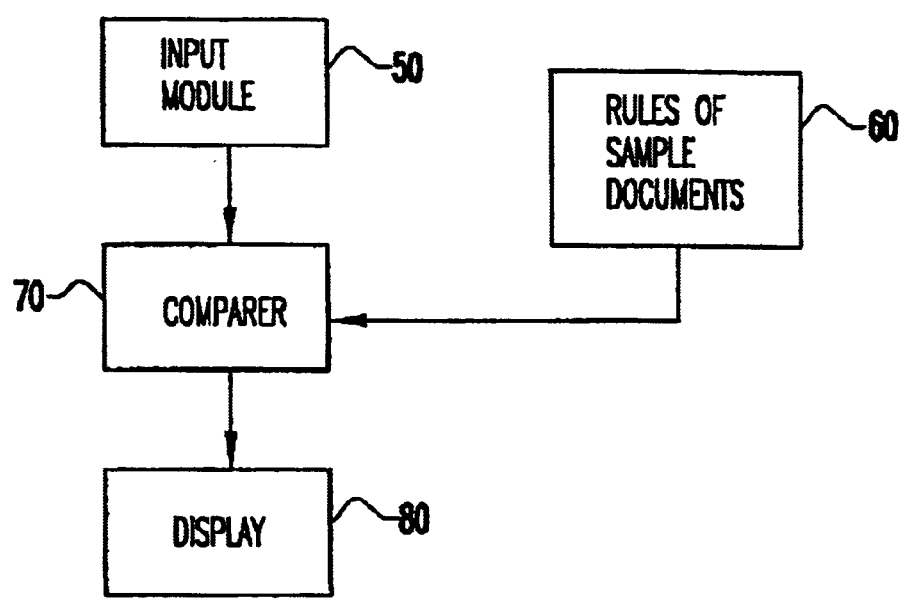
FIG. 2 is a general layout of the present invention.

Referring now to FIG. 2, a block diagram of the present invention is shown. More specifically, an input module 50 and a rule module 60 are provided. The input module provides one or more input documents to a comparer module 70, while the rule module 60 provides the rules (hereinafter referred to as extracted rules (i.e., words terms or phrases extracted from the vocabulary of the induced rules) induced from the sample set of documents to the comparer module 70. It is well understood that the extracted rules may be associated with one or more classes of sample input documents and may be used to provide a summary for each incoming document belonging to the same one or more classes.

The comparer module 70 compares each of the incoming documents to the extracted rules and determines whether there are any matches between the extracted rules and the words (or terms or phrases) of each of the incoming documents. The matches between the extracted rules and any words (or terms or phrases) of each of the incoming documents are provided in the display module 80 as a summary for each of the incoming documents.

It is contemplated by the present invention that in addition to a summary provided for each of the incoming documents, a header or other identifying feature associated with each of the incoming documents may be provided with the summary of each of the incoming documents. This allows the user to easily determine which summary belongs to which incoming document. It is important to note that the present invention is not limited to any specific identifying features and may include, for example, the title of the incoming document, the author of the incoming document, the date the incoming document was created or any other known identifying feature of the incoming document.

In still further embodiments of the present invention, the display may show an "address" (associated with the incoming documents), or may equally provide a hyperlink to the incoming documents. Other methods of retrieving the incoming documents (associated with the displayed summaries) are also contemplated for use with the present invention.

Method of Use of the Present Invention

Figure 3:
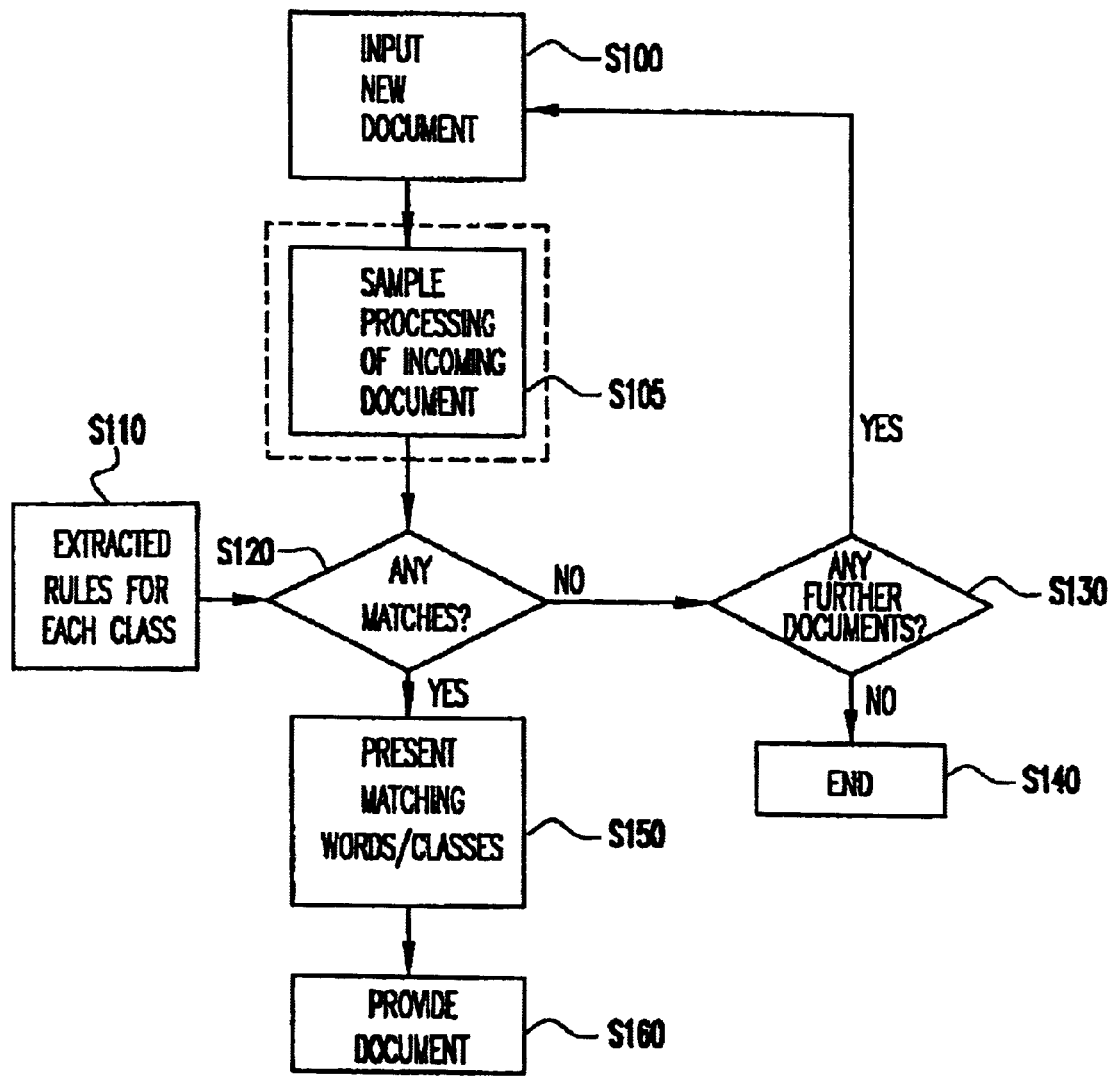
FIG. 3 is a flow diagram showing the steps needed to implement the method of the present invention.

FIG. 3 shows a flow diagram depicting the steps of implementing the method of the present invention. In step S100, a user inputs one or more input documents into the apparatus of the present invention. The input documents may be provided via the Internet, an intranet, LAN or other similar systems. In embodiments, in step S105, each of the incoming documents may be refined in order to provide a more concise description of the incoming document. Such processing may include (i) stemming, (ii) tokenization or (iii) any other well known text processing techniques. In step S110, the extracted set of rules for each class obtained via steps S10–S40 of FIG. 1 are input into the apparatus of the present invention. As with the incoming documents, the extracted set of rules may be provided via the Internet, an intranet, LAN or other similar systems.

Still referring to FIG. 3, in step S120, a determination is made as to whether there are any matches between the words or phrases or terms of each individual incoming document and the extracted rules of the sample documents. If there are no matches, then no summaries are presented and, in step S130, a determination is made as to whether there are any further documents to be input to the apparatus of the present invention. If there are no further documents, then the method of the present invention ends in step S140; however, if there are further document(s), then those additional documents are input in step S100.

If there are matches between the words or phrases or terms of an individual incoming document and the extracted rules of the sample documents, then the matching words of the incoming document are presented in step S150, which in preferred embodiment is a summary for each document within a class. It is well understood that steps S105, S120 and S150 are equally used with all incoming documents, and may be implemented via one document at a time or any combination of incoming documents depending on the particular desires of the user of the method and apparatus of the present invention. In view of the above discussion, it is now well understood that the presented matching words are used as the summaries of each of the incoming documents.

In step S160, the documents associated with the summaries may be provided. The step of S160 may be provided by furnishing a document address or hyperlink, for example.

Example of Use of The Present Invention

Provided herein is one illustrative example of providing a summary for individual documents in one or more classes using the method and apparatus of the present invention. It should be understood that the following example does not in any manner whatsoever limit the scope of the present invention, and it should further be realized that there are many further examples that may equally be used with the present invention.

By way of example, a set of documents relating to "purchasing a new home" (e.g., a class of documents) is provided to a machine learning system. The set of documents are trained on in order to obtain a set of rules, such as, for example, "purchase price" and "state of residence". The rules are then extracted and compared to incoming documents in order to provide a summary of the incoming documents.

In the present example, the first incoming document includes words that are matched with the extracted set of rules obtained from the sample set of documents; that is, for example, "a purchase price of a house in Armonk, N.Y. is $150,000". The apparatus of the present invention then displays this information as a summary to the incoming document. The apparatus of the present invention may further provide a header which identifies the summary as belonging to the document titled "Home Costs Are on the Rise". This same method can then be used for a second, third, etc. incoming document in order to provide a summary of the second, third, etc. incoming document.

As seen, by using the apparatus and method of the present invention, individual summaries of incoming documents can be obtained easily and cost efficiently.

While the invention has been described in terms a of preferred embodiments, those skilled in the art will recognize that the invention can be practiced with modification within the spirit and scope of the appended claims.

What is claimed is:

1. A method of providing summaries of documents belonging to a class of a classified document collection comprising:

inducing a set of rules from a sample set of documents, the set of rules being characteristic of the sample input documents;

comparing extracted words, phrases, and terms appearing in the set of rules induced from the sample set of documents to an individual incoming input document; and providing a summary of the individual incoming input document based on matches between the extracted words, phrases, terms and the individual incoming input document.

2. The method of claim 1, further comprising:

providing more than one individual incoming input document; and comparing the more than one individual incoming input document with the extracted words, phrases, and terms appearing in the set of rules induced from the sample set of documents in order to provide summaries of at least one of the more than one individual incoming input document.

3. The method of claim 2, wherein the more than one individual incoming input document is at least two individual incoming input documents.

4. The method of claim 3, wherein:

the sample set of documents belong to one or more classes of a classified document collection;

the at least two individual incoming input documents belong to the one or more classes of the classified document collection; and the comparing step compares the at least two individual incoming input documents with the extracted words, phrases, and terms appearing in the set of rules in order to provide a summary for each of the at least two individual incoming input documents, wherein the comparing step compares a same class of the at least two individual incoming input documents and the sample set of documents.

5. The method of claim 1, wherein:

the sample set of documents belong to one or more classes of a classified document collection; and the individual incoming input document belongs to one of the one or more classes of the classified document collection.

6. The method of claim 5, wherein the comparing step compares a same class of the individual incoming input document and the sample set of documents in order to provide a summary for the individual incoming input document.

7. The method of claim 1, wherein:

the comparing step compares the extracted words, phrases, and terms appearing in the set of rules to words or phrases or terms in the individual incoming input document; and the summary of the individual incoming input document includes word or term or phrase matches between the individual incoming input document and the extracted words, phrases, and terms like appearing in the set of rules.

8. The method of claim 7, further comprising refining the individual incoming input document prior to the comparing step.

9. The method of claim 8, wherein the refining step includes (i) stemming, (ii) tokenization or (iii) other morphological text processes.

10. The method of claim 1, further comprising providing an identifying feature of the individual incoming input document associated with the summary of the individual incoming input document, wherein the identifying feature includes at least (i) a title of the individual incoming input document, (ii) a date of creation of the individual incoming input document, and (iii) author's name of the individual incoming input document.

11. The method of claim 1, further comprising providing a means for obtaining the individual incoming input document after a summary of the individual incoming input document is provided.

12. The method of claim 1, further comprising training on the sample set of documents in order to induce the set of rules.

13. A method of providing summaries of documents belonging to a class of a classified document collection comprising:
    inducing a set of rules from a sample set of documents belonging to one or more classes of a classified document collection, the induced set of rules being characteristic of the sample input documents;
    extracting the set of rules in order to provide a concise description of the one or more classes of the sample documents;
    comparing the extracted set of rules to at least one individual incoming input document belonging to a same class as the sample set of documents; and
    providing a summary of each of the at least one individual incoming input document based on matches between the set of extracted rules and the individual incoming input document.

14. A means for providing summaries of documents belonging to a class of a classified document collection comprising:
    means for inducing a set of rules from a sample set of documents, the induced set of rules being characteristic of the sample input documents;
    means for comparing extracted words, phrases, and terms appearing in the set of rules induced from the sample set of documents to at least one individual incoming input document; and
    means for providing a summary of each of the at least one individual incoming input document based on matches between a vocabulary of the set of rules induced from the sample set of documents and the at least one individual incoming input document.

15. The means of claim 14, wherein the inducing means further comprises means for extracting the set of rules in order to provide a concise description of one or more classes associated with the sample documents.

16. The means of claim 15, wherein:
    the comparing means compares the concise description of the extracted set of rules to the at least one individual incoming input document; and
    the summary of the individual incoming input document includes the word or term or phrase matches between the at least one individual incoming input document and the concise description of the extracted set of rules induced from the sample set of documents.

17. The means of claim 14, further comprising identifying means for identifying the summary as belonging to the at least one individual incoming input document wherein the identifying feature includes at least (i) a title of the document, (ii) a date of creation of the document, and (iii) author's name.

18. The means of claim 14, further comprising means for refining the individual incoming input document prior to the comparing step, wherein the refining includes at least (i) stemming, (ii) tokenization or (iii) morphological text processing.

19. A computer program product comprising:
    a computer usable medium having computer readable program code embodied in the medium for query-object synthesis/modification, the computer program product having:
    first computer program code for inducing a set of rules from a sample set of documents, the sample set of documents belonging to at least one class of a classified document collection and the set of rules being characteristic of the sample input documents;
    second computer program code for extracting the set of rules in order to provide a concise description of one or more classes of the sample documents;
    third computer program code for comparing the extracted set of rules to at least one individual incoming input document; and
    fourth computer program code for providing a summary of each of the at least one individual incoming input document based on matches between the set of extracted rules and the individual incoming input document.

* * * * *